United States Patent
Mokashi et al.

(10) Patent No.: US 12,124,361 B1
(45) Date of Patent: Oct. 22, 2024

(54) ESTIMATING EFFECT OF A SYSTEM CHANGE ASSOCIATED WITH USER INTERFACE USING SYNTHETIC CONTROL

(71) Applicant: Amazon Technologies, Inc., Seattle, WA (US)

(72) Inventors: Ronil Sudhir Mokashi, Mercer Island, WA (US); Min Kyoung Kang, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 131 days.

(21) Appl. No.: 18/067,466

(22) Filed: Dec. 16, 2022

(51) Int. Cl.
*G06F 11/36* (2006.01)
*G06F 8/65* (2018.01)

(52) U.S. Cl.
CPC ............ *G06F 11/3688* (2013.01); *G06F 8/65* (2013.01)

(58) Field of Classification Search
CPC ................................ G06F 8/65; G06F 11/3688
See application file for complete search history.

(56) References Cited

U.S. PATENT DOCUMENTS

| | | | |
|---|---|---|---|
| 2014/0047085 A1* | 2/2014 | Peters | H04L 65/80 709/221 |
| 2018/0248939 A1* | 8/2018 | Sun | H04L 41/142 |

OTHER PUBLICATIONS

Palacin et al., "The Impact of Content Delivery Networks on the Internet Ecosystem" (Year: 2013).*
Mangili et al., "Performance analysis of Content-Centric and Content-Delivery networks with evolving object popularity" (Year: 2016).*
Herbaut et al., "Dynamic Deployment and Optimization of Virtual Content Delivery Networks" (Year: 2017).*
Yaxin Chao, "Content Delivery Networks" (Year: 2003).*
Matt Calder, Measuring the Impact of CDN Design Decisions (Year: 2019).*

* cited by examiner

*Primary Examiner* — Phillip H Nguyen
(74) *Attorney, Agent, or Firm* — Knobbe, Martens, Olson & Bear, LLP (57) ABSTRACT

System and methods are provided estimating long-term effects of system changes associated with a user interface without conducting long-term testing. In a first deployment region, a system change is released during a time period. A second deployment region does not have the system change released in the same time period. Historical data is received from both deployment regions associated with the time period. The user interface analysis system determines features from the historical data and determines a synthetic control sub-group from those features that correspond to features for a sub-group in the first deployment region. The user interface analysis system calculates a control outcome metric for the control sub-group and calculates an effect metric as a difference between a first outcome metric for the sub-group from the first deployment region and the control outcome metric.

20 Claims, 5 Drawing Sheets

Estimate Effect of System Change

Compare to: [ C ▾ ] using [ USD Currency ▾ ] [ update ]

Filter to: [ all metrics ▾ ] [ all segments ▾ ]

Dates: 8/8/2022 – 11/3/2022        Acquisitions

| Dimension | | Overall | | | | Indicator | | |
|---|---|---|---|---|---|---|---|---|
| | | Users 312 | Credit | Mean | 322 Impact 316 | Users | % of all | Impact 332 |
| All | C | 330  18,545,198 | $89,582,582 | $4.8305 314 | | 12,815,050 | 69.10% | 340 |
| | T1 310 | 1,030,654 | $4,976,513 | $4.8285 | −0.03% 324 (−0.12%, 0.05%) | 711,623  338 | 69.04% | −0.08% (−0.11%, 0.05%) |
| | T2 | 1,029,607 | $4,978,562 | $4.8354 | 0.07% 326 (−0.01%, 0.15%) | 711,132 | 69.07% | −0.05% (−0.08%, 0.02%) |
| | MIXED | 334  331 342 | $3,431 | $10.36 | 0.00% (−2.94%, 2.94%) | 321  336 | 96.98% | 0.00% (−8.00%, 8.00%) |
| Home Page | C | 18,545,198 | $42,564,711 | $2.2952 | 346 | 11,070,811  350 | 59.70% | |
| | T1 | 1,030,654 | $2,353,932 | $2.2839 | −0.44% 344 (−0.54%, 0.35%) | 613,622  348 | 59.54% | −0.27% (−0.31%, −0.23%) |
| | T2 | 1,029,607 | $2,360,233 | $2.2923 | −0.14% (−0.24%, 0.04%) | 613,833 | 59.62% | −0.13% (−0.16%, −0.09%) |
| | MIXED | 331 | $1,563 | $4.72 | 0.00% (−15.83%, 15.83%) | 287 | 86.71% | 0.00% (−6.59%, 6.59%) |

ESTIMATING EFFECT OF A SYSTEM CHANGE ASSOCIATED WITH USER INTERFACE USING SYNTHETIC CONTROL

BACKGROUND

A/B testing can be a user experience research methodology. A/B tests can consist of a randomized experiment that involves at least two variants. A/B tests can be run for several weeks and aim to measure long-term impact of a system change associated with a user interface. A long-term holdout experiment (which can last several months) can be when a small control group of users is held out of a system change (such as a new user interface feature) to measure long term effects. In a Content Delivery Network (CDN), ten percent of users in a region can be exposed to a system change and the remainder of users in the region may not be exposed to the system change for a period of time. These tests can be used to determine the impact of making a system change, which can be measured by some metric. In some cases, A/B tests are run for a relatively short period of time, such as four weeks. In other cases, A/B tests are run for a relatively longer period of time, such as, but not limited to, three months or longer. Long-term tests can provide more reliable results than short-term tests.

BRIEF DESCRIPTION OF THE DRAWINGS

Various features, aspects, and advantages are described below with reference to the drawings, which are intended for illustrative purposes and should in no way be interpreted as limiting the scope of the embodiments. Furthermore, various features of different disclosed embodiments can be combined to form additional embodiments, which are part of this disclosure. In the drawings, like reference characters can denote corresponding features throughout similar embodiments. The following is a brief description of each of the drawings.

DETAILED DESCRIPTION

As described above, tests, such as A/B tests or long-term holdout tests, can be used to determine or predict the impact of making a system change associated with a user interface. However, there can be one or more technical considerations that limit or even prohibit running tests in some cases. For example, there can be multiple system changes for potential release. It may be technically impossible or difficult to test multiple of the system changes in separate tests at the same time, thereby limiting the number of tests that can be run at a time. Running tests may involve making changes to the user interface to filter traffic to different variants of the user interface, which can be technically difficult to setup and/or execute. As described above, long-term tests can provide more reliable results than short-term tests. However, the technical challenges mentioned above can be further exacerbated for relatively longer running tests.

Generally described, some aspects of the present disclosure are directed to solutions for estimating the effect of a system change associated with a user interface using a synthetic control. The solutions described herein may achieve similar or improved results relative to the results of an experiment, such as a long-term test, but without having to run any testing. In a first deployment region (such as an Italian region), a system change (such as a change or addition to a user interface feature) can be released during a time period. A second deployment region (such as a Spanish region) may not have the system change released in the same time period. The release to the first deployment region and not the second deployment region may advantageously be a part of a normal release methodology and may not involve any testing. Historical data can be received from both deployment regions associated with the time period. The user interface analysis system can determine features from the historical data and determine a synthetic control subgroup from those features that correspond to features for a sub-group in the first deployment region. The user interface analysis system can calculate control outcome metric for the control sub-group and calculate an effect metric as a difference between a first outcome metric for a first sub-group from the first deployment region and the control outcome metric. The effect metric can advantageously estimate the effect of the user interface change without running any tests on users and/or having to implement tests in deployment regions. The user interface analysis system can present the effect metric to users of the user interface analysis system. In some embodiments, the user interface analysis system can automatically take some action in response to the effect metric. For example, the user interface analysis system can automatically disable the system change (such as a released user interface feature) for a period of time if the effect metric fails to satisfy some threshold. The automatic action can then be reviewed by an analyst and the analyst can determine what to do next, such as either approving the automatic action or reversing it.

The systems and methods described herein may improve computer networks. As described herein, long-term tests, such as long-term holdout experiments, can be a preferred method of determining the long-term effects of a system change in a computer network with a user interface. However, long-term tests can require exposing five to ten percent of user traffic to a user interface without the system change for a period of time. This may expose a percentage of user to a negative user experience for the period of time. In some existing systems and long-term tests, network traffic has to be divided into different lanes for different types of testing. Moreover, reserving a portion of network traffic to not receive the system change for several months can be difficult, especially when there may be multiple system changes each of which could be the subject of a different test. It may not be technically possible to run multiple tests simultaneously in a computer network due to these limitations. Executing tests in a computer network may also require computing resources to design, implement, and analyze those tests. For example, dividing network traffic for testing can involve using cookies and/or session identifiers to identify and forward users within a computer network for testing purposes. However, errors can occur in the routing and users can be subjected to a negative experience due to those errors (for example, a lost cookie or a lost session could inadvertently switch a user between test variants and/or cause the user experience graphical user interface errors). Moreover, some deployment regions may have a small amount of network traffic that prohibits those deployment regions from participating in long-term tests. The solutions described herein can avoid one or more of the foregoing issues because long-term impact can be measured without having to run any long-term tests. Therefore, the systems and methods described herein can improve computer networks because using synthetic control to estimate long-term effects without any testing can advantageously: (i) not subject a portion of network users to missing system changes; (ii) not congest or require division of network traffic based on multiple test variants; (iii) allow a normal deployment release schedule to occur; (iv) not subject users to errors caused by the testing setup and infrastructure; and/or (v) allow deployment regions with smaller network traffic footprints to also estimate the effect of system changes.

Figure 1:
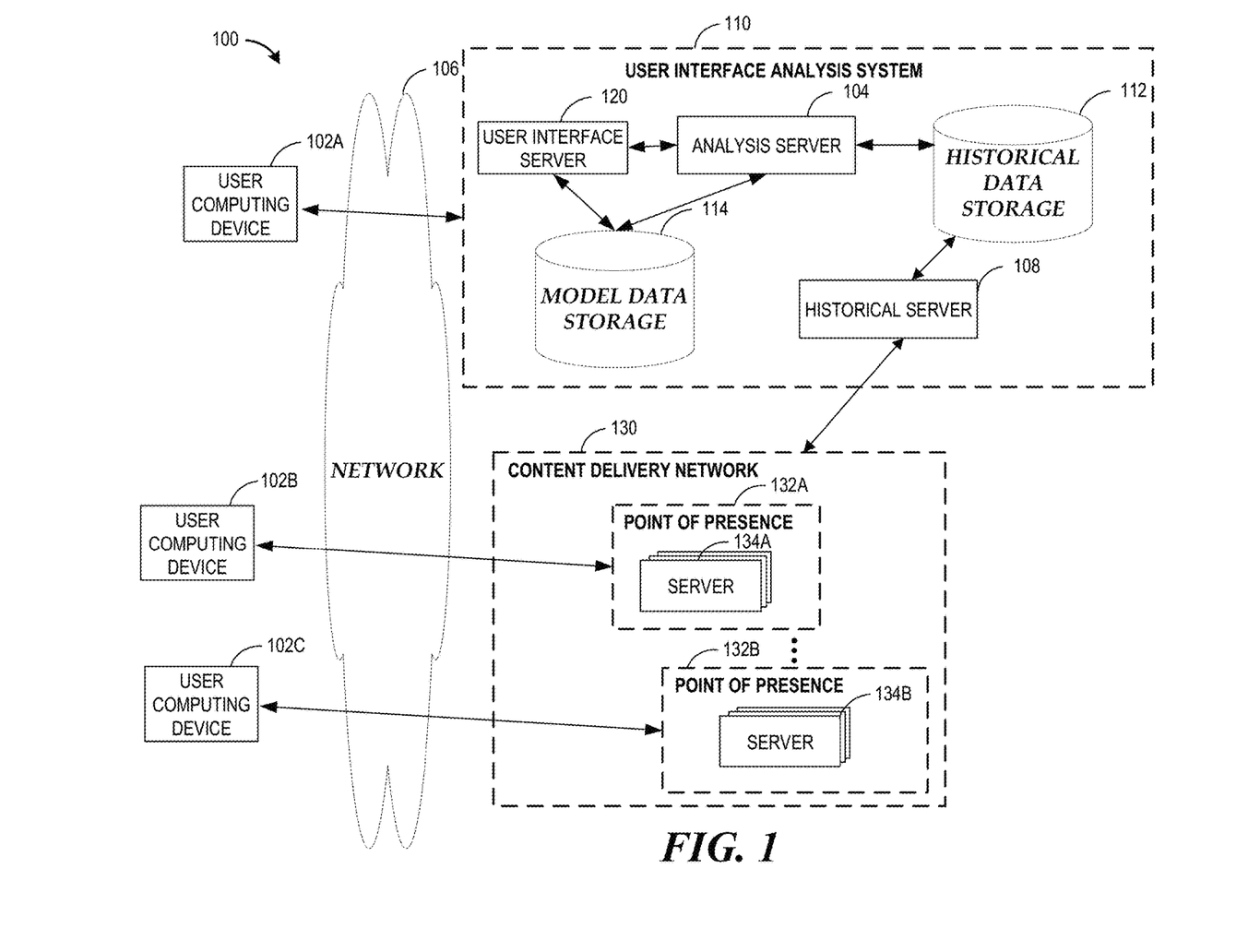
FIG. 1 is a schematic block diagram depicting an illustrative network environment with a Content Delivery Network and user interface analysis system.

Turning to FIG. 1, an illustrative network environment 100 is shown. The network environment 100 may include user computing devices 102A, 102B, 102C, a user interface analysis system 110, and a CDN 130. The CDN 130 includes points of presence (PoPs) 132A, 132B. The PoPs 132A, 132B can include servers 134A, 134B. The constituents of the network environment 100 may be in communication with each other either locally or over a network 106. As used herein, a "point of presence (PoP)" can refer to collection of devices, such as servers, routers, and/or switches that collectively reflect a demarcation point between two or more networks.

The user computing devices 102A, 102B, 102C can include, but are not limited to, a laptop or tablet computer, personal computer, personal digital assistant (PDA), hybrid PDA/mobile phone, smart wearable device (such as a smart watch), mobile phone, a smartphone, set-top or other television box, television or smart television, and/or video-game console or other gaming device. A first user computing device 102A can interact with the user interface analysis system 110. The first user computing device 102A can be associated with an owner of the user interfaces in the deployment regions. The second user computing device 102B can be assigned to a deployment region and the third user computing device 102C can each be assigned to a different deployment region. The first deployment region can be hosted by the first PoP 132A and the second deployment region can be hosted by the second PoP 132B. As described herein, in some embodiments, a system change can be present in the first deployment region as hosted by the first PoP 132A and the system change may not be present in the second deployment region as hosted by the second PoP 132B. In other embodiments, the first and second deployment regions can be hosted by the same PoP(s) 132A, 132B and the servers 134A and 134B can include logic to determine which deployment region should be provided to which user computing device 102B, 102C. In some embodiments, the servers 134A and 134B can include logic to geolocate the user computing devices 102B, 102C. For example, a user computing device 102B that is geolocated to Spain can be routed to a Spanish deployment region. In some embodiments, the servers 134A and 134B can include logic to analyze requests from the user computing devices 102B, 102C to determine language header data in the requests. For example, a request with language header data that indicates an Italian language can be routed to an Italian deployment region.

The user interface analysis system 110 can include a user interface server 120, an analysis server 104, a historical server 108, a historical data storage 112, and a model data storage 114. The historical server 108 can receive historical data from the deployment regions hosted by the PoPs 132A, 132B. The historical data can include user data, user interaction data, outcome metrics, and/or data related to the system changes. The historical data can include, but is not limited to, user visits, user interaction features used, duration of time, days of user visits, services used, user engagements, and/or acquisitions. As described herein, first historical data can be from a deployment region where a system change was present during a time period; and second historical data can be from a deployment region where the system change was not present during the time period. The historical server 108 can store the historical data in the historical data storage 112.

The analysis server 104 can cluster user profiles associated with the deployment regions into sub-groups. In some embodiments, the analysis server 104 can start with geolocation of users (such as postal codes) in a deployment region. The analysis server 104 can further cluster user profiles into sub-groups based on similar features. The analysis server 104 can receive the historical data from the historical data storage 112. The analysis server 104 can calculate features from the historical data. Features can include, but are not limited to, number of visits per week, number of uses of a user interface feature per week, duration of time in service, number of active days per week, utilization of service rate, total amount paid to service, user engagements per week, a total amount of acquisitions, a status of a user profile (e.g., a premium user profile or a non-premium user profile), and/or tenure of a user profile (such as length of time a user profile has been registered with the user interface). In some embodiments, outcome metrics can be one or more of the features, such as total amount paid and/or total amount of acquisitions. In some embodiments, the analysis server 104 can determine features from the historical data for each sub-group. The features for each sub-group can be represented with a statistical measure, such as an average. Thus, the features for each sub-group can be, but is not limited to, average number of visits per week, average number of uses of a user interface feature per week, average duration of time in service, average number of active days per week, average utilization of service rate, average total amount paid to service, average user engagements per week, and/or average total amount of acquisitions per sub-group.

Using the features, the analysis server 104 can determine a synthetic control sub-group for a deployment region from weighted sub-groups from a different deployment region that did not receive a system change. The analysis server 104 can generate a synthetic control sub-group that mimics a sub-group in a deployment region that had a system change. The analysis server 104 can scale the outcome metrics for the sub-group with the system change and the outcome metrics for the weighted sub-groups from the different deployment region that did not receive the system change. The analysis server 104 can calculate an effect metric as a difference between a scaled outcome metric for the sub-group with the system change and a scaled outcome metric for the weighted sub-groups that act as a synthetic control group. The effect metric can be an estimation of the effect of the system change without running any tests on users and/or having to implement tests in deployment regions. The user interface server 120 can present one or more effect metrics and other data to the user computing device 102A in a graphical user interface. In some embodiments, the analysis server 104 can store data in the model data storage 114, such as, any data associated with the graphical user interfaces of the user interface analysis system 110. In some embodiments, the analysis server 104 can store data, such as, but not limited to, one or more effect metrics, data associated with the effect metrics (such as credit or mean values), and/or numbers of users in the model data storage 114.

The historical data storage 112 and/or the model data storage 114 may be embodied in hard disk drives, solid state memories, any other type of non-transitory computer-readable storage medium. The historical data storage 112 and/or the model data storage 114 may also be distributed or partitioned across multiple local and/or remote storage devices. The historical data storage 112 and/or the model data storage 114 may include a data store. As used herein, a "data store" can refer to any data structure (and/or combinations of multiple data structures) for storing and/or organizing data, including, but not limited to, relational databases (e.g., Oracle databases, MySQL databases, etc.), non-relational databases (e.g., NoSQL databases, etc.), key-value databases, in-memory databases, tables in a database, and/or any other widely used or proprietary format for data storage.

The network 106 may be any wired network, wireless network, or combination thereof. In addition, the network 106 may be a personal area network, local area network, wide area network, cable network, satellite network, cellular telephone network, or combination thereof. In addition, the network 106 may be an over-the-air broadcast network (e.g., for radio or television) or a publicly accessible network of linked networks, possibly operated by various distinct parties, such as the Internet. In some embodiments, the network 106 may be a private or semi-private network, such as a corporate or university intranet. The network 106 may include one or more wireless networks, such as a Global System for Mobile Communications (GSM) network, a Code Division Multiple Access (CDMA) network, a Long-Term Evolution (LTE) network, or any other type of wireless network. The network 106 can use protocols and components for communicating via the Internet or any of the other aforementioned types of networks, such as HTTP, TCP/IP, and/or UDP/IP.

Additionally, in some embodiments, the user interface analysis system 110 and the CDN 130 or components thereof are implemented by one or more virtual machines implemented in a hosted computing environment. The hosted computing environment may include one or more rapidly provisioned and/or released computing resources. The computing resources may include hardware computing, networking and/or storage devices configured with specifically configured computer-executable instructions. A hosted computing environment may also be referred to as a "serverless," "cloud," or distributed computing environment.

Figure 2:
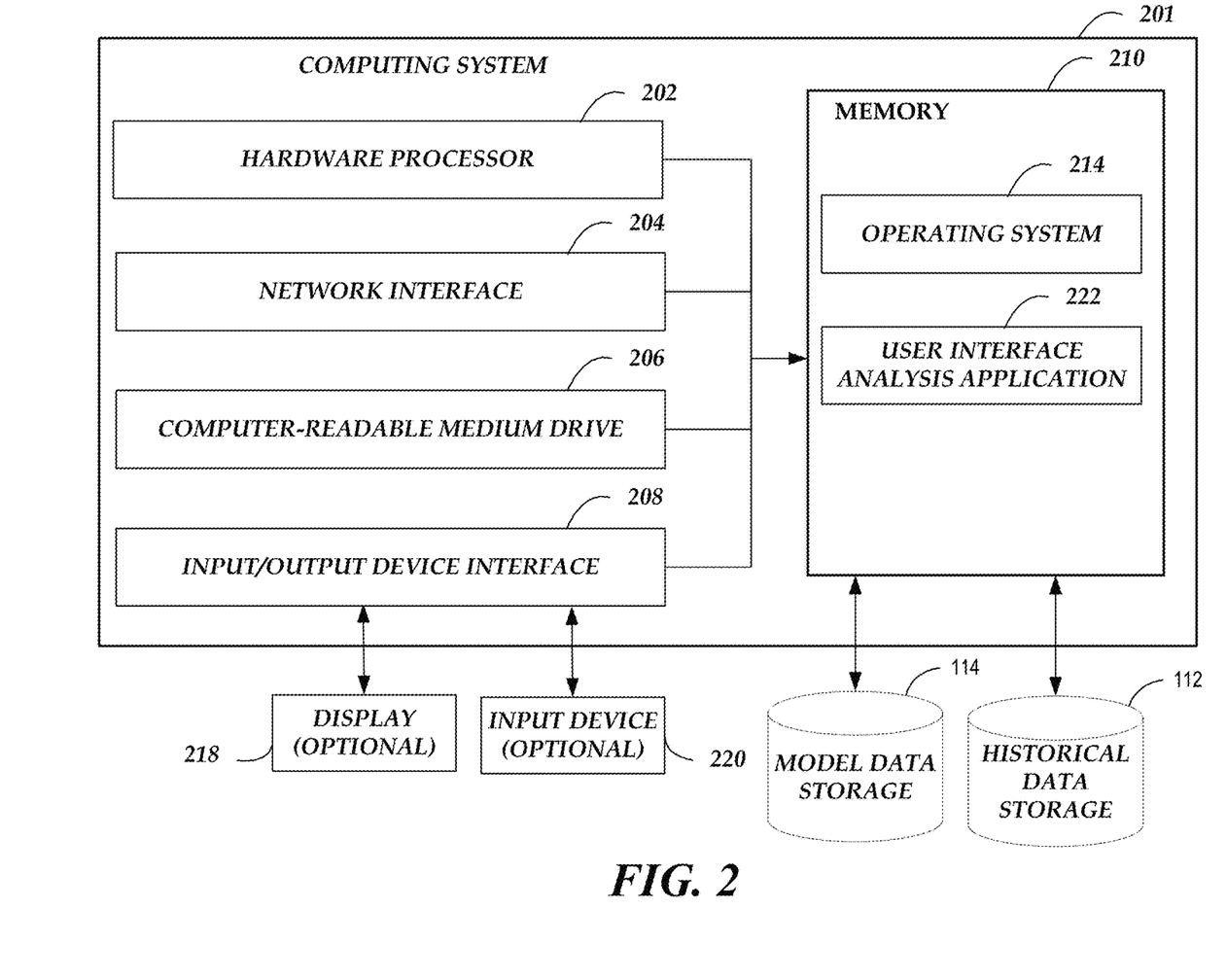
FIG. 2 is a schematic diagram depicting an illustrative general architecture of a computing system for implementing one or more devices referenced in the network environment depicted in FIG. 1.

FIG. 2 is a schematic diagram of an illustrative general architecture of a computing system 201 for implementing a computing device within the user interface analysis system 110 referenced in the environment 100 FIG. 1. The computing system 201 includes an arrangement of computer hardware and software components that may be used to execute the user interface analysis application 222. The general architecture of FIG. 2 can be used to implement other devices described herein, such as the user computing device 102A, 102B, 102C and/or a server 134A, 134B within a PoP 132A, 132B referenced in FIG. 1. The computing system 201 may include more (or fewer) components than those shown in FIG. 2. Further, other computing systems described herein may include similar implementation arrangements of computer hardware and/or software components.

The computing system 201 for implementing a device within the user interface analysis system 110 may include a hardware processor 202, a network interface 204, a non-transitory computer-readable medium drive 206, and an input/output device interface 208, all of which may communicate with one another by way of a communication bus. As illustrated, the computing system 201 is associated with, or in communication with, an optional display 218 and an optional input device 220. The network interface 204 may provide the computing system 201 with connectivity to one or more networks or computing systems. The hardware processor 202 may thus receive information and instructions from other computing systems or services via the network 106. The hardware processor 202 may also communicate to and from memory 210 and further provide output information for an optional display 218 via the input/output device interface 208. The input/output device interface 208 may accept input from the optional input device 220, such as a keyboard, mouse, digital pen, and/or touch screen. The input/output device interface 208 may also output audio data to speakers or headphones (not shown).

The memory 210 may contain specifically configured computer program instructions that the hardware processor 202 executes in order to implement one or more embodiments of a device within the user interface analysis system 110. The memory 210 generally includes RAM, ROM and/or other persistent or non-transitory computer-readable storage media. The memory 210 may store an operating system 214 that provides computer program instructions for use by the hardware processor 202 in the general administration and operation of the device within the user interface analysis system 110.

The memory 210 may include a user interface analysis application 222 that may be executed by the hardware processor 202. In some embodiments, the user interface analysis application 222 may implement various aspects of the present disclosure. In some embodiments, the user interface analysis application 222 can cluster user profiles, process features, and/or model synthetic control. The user interface analysis application 222 can communicate with the historical data storage 112 and/or the model data storage 114. In some embodiments, the user interface analysis application 222 can estimate an effect of a system change associated with a user interface.

Figure 3A:
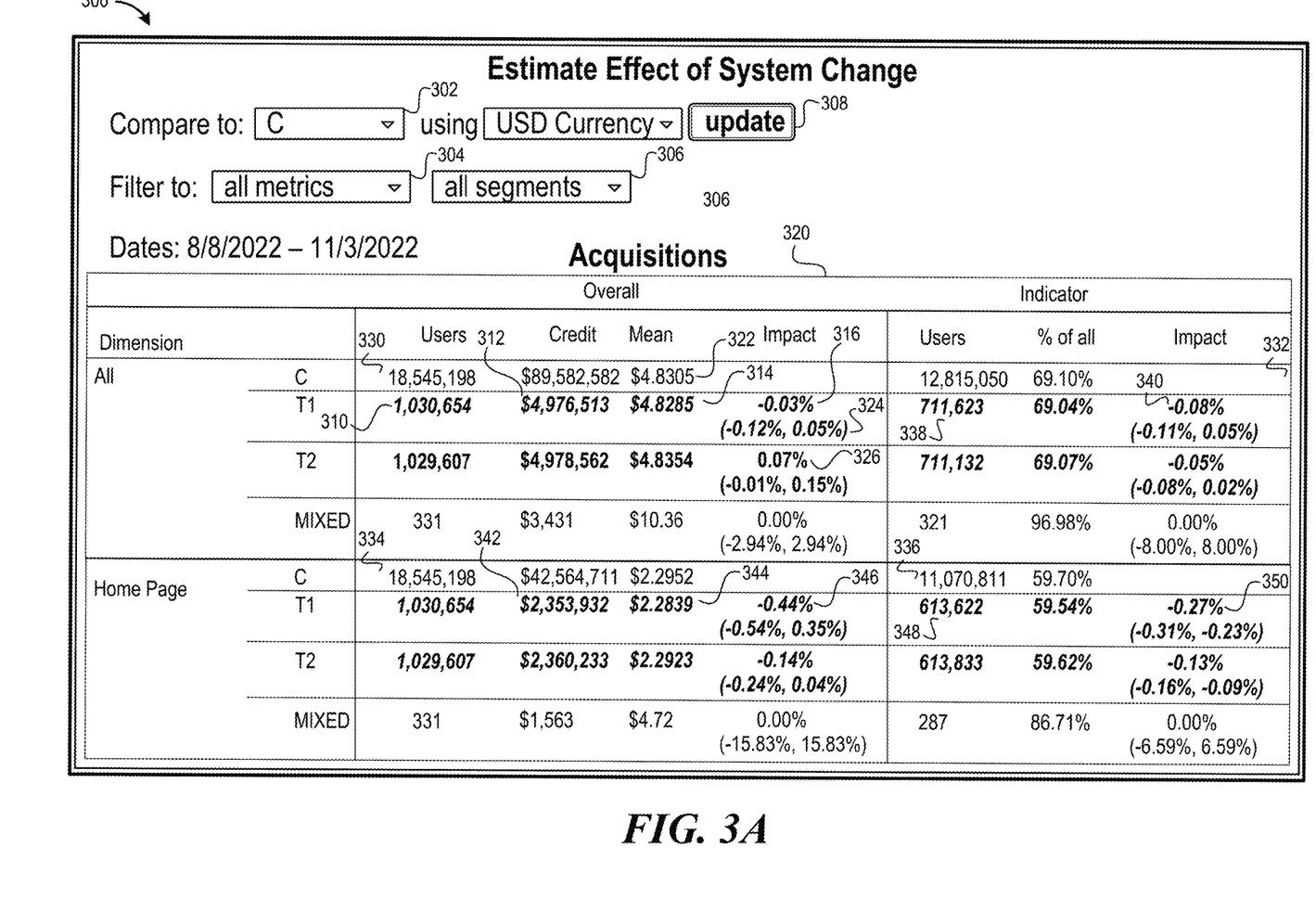
FIG. 3A is a pictorial diagram of a graphical user interface of the user interface analysis system.

FIG. 3A depicts a graphical user interface 300 of the user interface analysis system 110. The graphical user interface 300 can include a comparison group element 302, a metrics element 304, a segments element 306, and an update element 308. The graphical user interface 300 can depict one or more effect metrics. For example, in FIG. 3A, the depicted effect metrics include the impact value 316. In some embodiments, the one or more effect metrics can be a positive or negative value. The one or more effect metrics can indicate the impact (which can be positive or negative) of a system change associated with a user interface based on the synthetic control methods described herein.

The graphical user interface 300 can include a presentation area 320. The presentation area 320 can include information for each group for one or more deployment regions. For example, the presentation area 320 includes a number of users 310, a credit value 312, a mean value 314, and an impact value 316 for a group with the system change (here the "T1" group). In the example of FIG. 3A, the impact value 316 can represent the impact by the system change to the "T1" group relative to another group (here the "C" group) on a particular feature, such as an acquisitions feature. The number of users 310 can be the amount of users in the T1 group for the time period (here Aug. 8, 2022 until Nov. 3, 2022). The credit value 312 can be a total amount of acquisitions that occurred in the "T1" group during the time period. The mean value 314 can be the credit value 312 divided by the number of users 310 for the "T1" group. The impact value 316 for the "T1" group can be a percentage change between the mean value 314 for the "T1" group and the mean value 322 for the "C" group. In this case, the system change for the "T1" group can possibly have a negative change as indicated by the negative percentage change impact value 316. The presentation area can also include a confidence interval 324 that is the range of estimates for the impact value 316. As shown, the Conversely, the system change for the "T2" group can possibly have a positive change as indicated by the positive percentage change impact value 326.

The presentation area 320 can include multiple sub-areas 330, 332, 334, 336. The multiple sub-areas 330, 332, 334, 336 can be split out by dimension and/or indicator type. For example, in the first sub-area 330, all user profiles (as indicated by the number of users 310 in the first sub-area 330) from the "T1" group can be used to calculate the credit value 312, the mean value 314, and the impact value 316. In the second sub-area 332, only the user profiles (as indicated by the number of users 338 in the second sub-area 332) from the "T1" group where there was some activity with respect to effect metric feature (here acquisitions) can be used to calculate the second impact value 340. As another example, in the first sub-area 330, all activity from the corresponding user interface for the "T1" group can be used to calculate the credit value 312, the mean value 314, and the impact value 316. In the third sub-area 334, only activity from a portion of the user interface (here the "Home Page" portion of the user interface) from the "T1" group can be used to calculate the additional credit value 342, mean value 344, and impact value 346. In the fourth sub-area 336, (i) only the user profiles (as indicated by the number of users 348 in the fourth-sub area 330) from the "T1" group where there was some activity with respect to effect metric feature (here acquisitions) and (ii) only activity from the portion of the user interface (here the "Home Page" portion of the user interface) can be used to calculate the fourth impact value 350.

In the graphical user interface 300, the "T1" group can refer to a first group of user profiles where a system change was deployed to a deployment region during the time period. The "T1" group can refer to a second group of user profiles where a different system change was deployed to a second deployment region during the time period. The presentation of data for the "T1" and "T2" groups in the presentation area 320 can allow a user to compare the impact of different system changes. In the graphical user interface 300, the "mixed" group can refer to user profiles that changed deployment regions during the time period.

In some embodiments, a user can use one or more of the user interface elements 302, 304, 306 and the update element 308 to change the presentation area 320. A user can change the base comparison group with the comparison group element 302 and then select the update element 308. For example, a user can change the base comparison group to the "T2" group and the impact values 316, 340, 346, 350 and other data in the presentation area 320 can update to reflect the impact of the system change in the "T1" group relative to the "T2" group. A user can select a metric with the metrics element 304 and/or a segment with the segments element 306 and then select the update element 308. A metric and/or segment in the graphical user interface 300 can correspond to a feature of the historical data. A metric can include, but is not limited to, number of visits per week, number of uses of a user interface feature per week, duration of time in service, number of active days per week, utilization of service rate, total amount paid to service, and/or user engagements per week. A segment can include, but is not limited to, a status of a user profile and/or tenure of a user profile. Upon selection of a metric and/or a segment, the impact values 316, 340, 346, 350 and other data in the presentation area 320 can update to reflect a filtering of the data to the particular metric and/or segment.

Figure 3B:
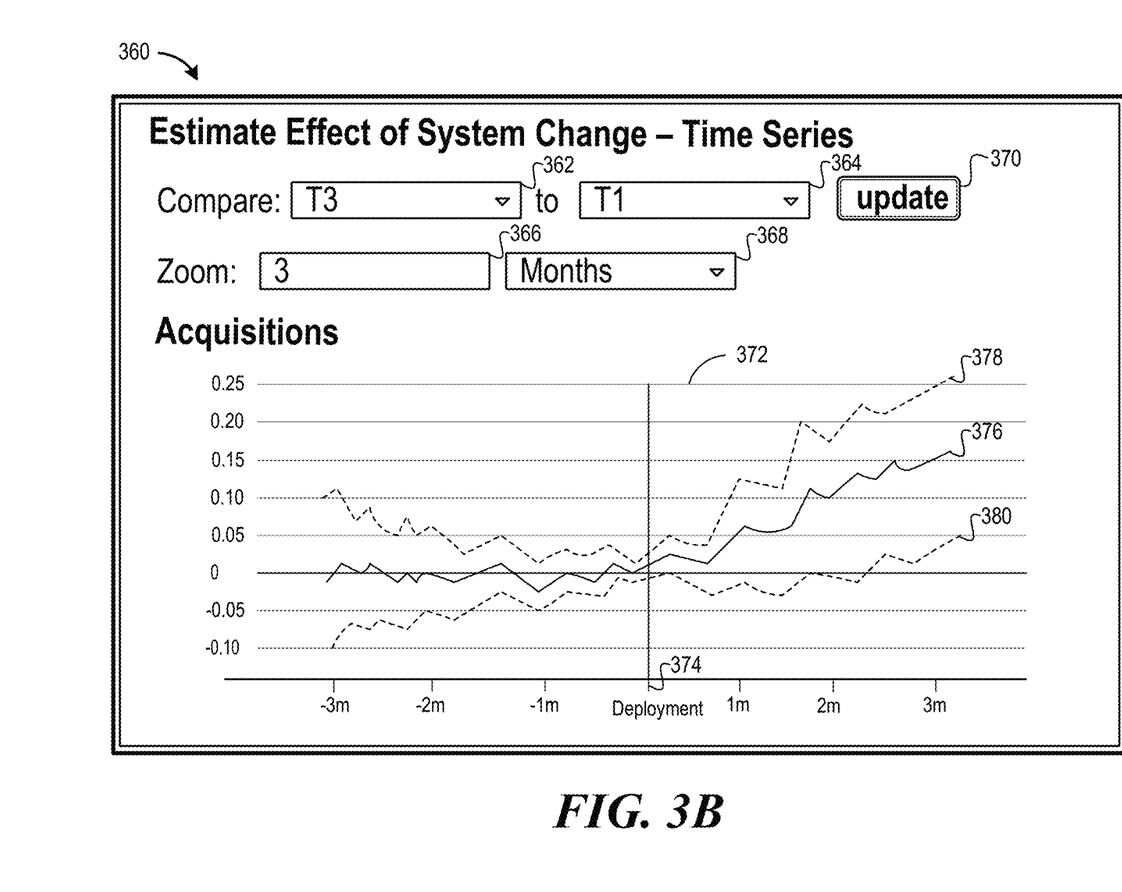
FIG. 3B is a pictorial diagram of another graphical user interface of the user interface analysis system.

FIG. 3B depicts another graphical user interface 360 of the user interface analysis system 110. The graphical user interface 360 can include a first comparison group element 302, a second comparison group element 364, a first time period element 366, a second time period element 368, and an update element 370. The graphical user interface 300 can include a visualization 372. The visualization 372 can present time series effect metrics.

The visualization 372 can present time series data as one or more graphs 376, 378, 380. For example, a first impact graph 376 can depict the impact over time for a group with the system change (here the "T3" group) relative to another group (here the "T1" group) without that system change for a particular feature, such as an acquisitions feature. The visualization 372 can depict impact as a percentage change on one axis and time on another axis. On the time axis, time zero 374 can be when the deployment of the system change occurred, before time zero is before any system change, and after time zero is after the deployment of the system change. The additional graphs 378 and 380 can depict the confidence interval of the impact over time.

In some embodiments, a user can use one or more of the user interface elements 362, 364, 366, 368 and the update element 370 to change the visualization 372. A user can change the group with the system change with the second comparison group element 364 and the base comparison group with the first comparison group element 362 and then select the update element 370. For example, a user can change the base comparison group to the "T2" group and the visualization 372, including the one or more graphs 376, 378, 380, can update to reflect the impact of the system change in the "T3" group relative to the "T2" group over time. A user can select the first time period element 366 and/or the second time period element 368 and then select the update element 308. For example, a user can change the first time period element 366 to the number six (6) and the second time period element 368 to weeks. Upon selection of the time period element(s) 366, 368, the visualization 372, including the one or more graphs 376, 378, 380, can update to reflect the change to the time period.

Figure 4:
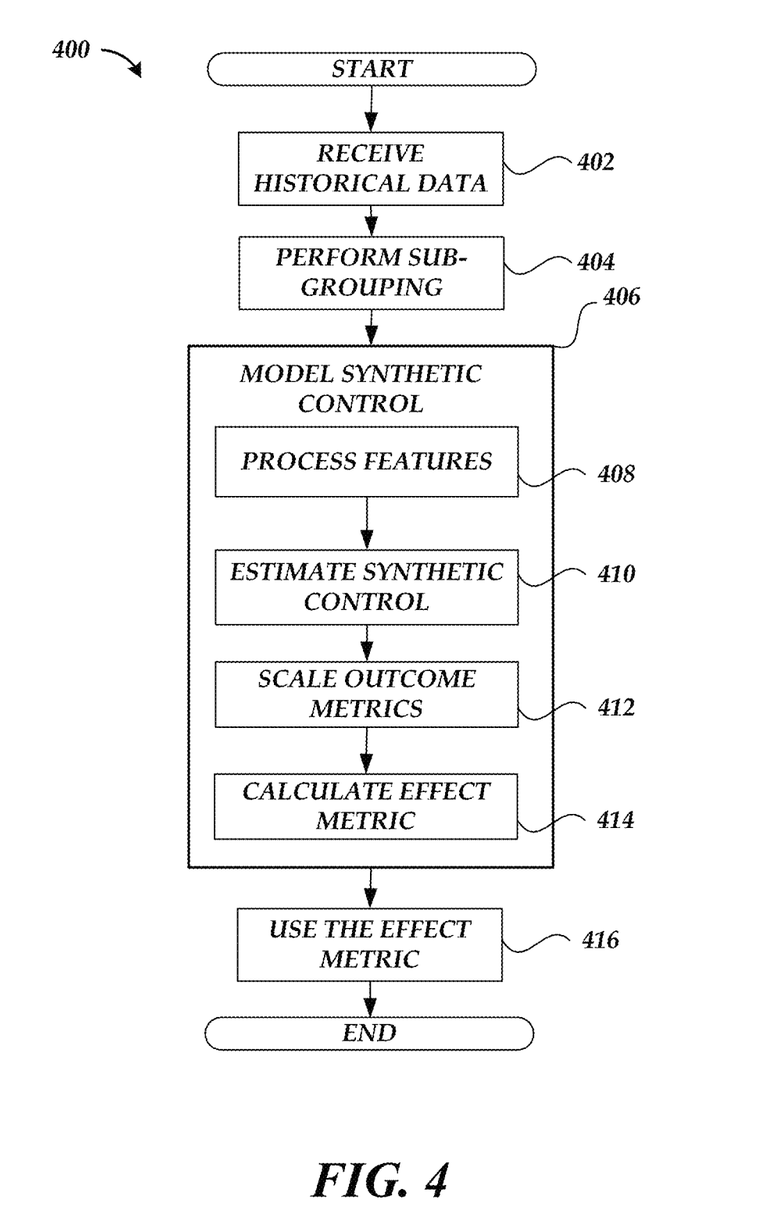
FIG. 4 is a flow diagram depicting a method for estimating the effect of a system change associated with a user interface using synthetic control.

FIG. 4 is a flow diagram depicting a method 400 implemented by the user interface analysis system 110 for calculating effect metrics. As described herein, the user interface analysis system 110 may include a historical server 108, an analysis server 104, and a user interface server 120. In some embodiments, the historical server 108, the analysis server 104, and the user interface server 120 may implement aspects of the method 400.

Beginning at block 402, historical data can be received. The historical server 108 can receive historical data from the CDN 130. The historical server 108 can receive historical data for a deployment region and a time period. The deployment region(s) can be in the CDN 130. Some of the historical data may be for a deployment region where a system change was present. Other historical data may be for a deployment region where the system change was not present. For example, a system change can be deployed to an Italian region and not deployed to a Spanish region for the same time period. As discussed herein, an advantage of the methodology described herein is that system changes can be released as desired without having to perform long-term testing, such as long-term A/B testing or long-term holdout testing. A system change can include new user interface features, such as a new hover-over user interface feature, for example. In some embodiments, a system change can include releasing new content, such as new streaming video content. System changes can also include changes associated with a user interface where the user does not directly view the change and/or where the change is on the backend associated with the user interface. For example, a system change can be related to backend performance improvements for a user interface, such as improving the latency for providing search results. In some embodiments, the historical data from the deployment regions with and without a system change can be from the same or substantially the same time period. As described herein, historical data can include, but is not limited to, user profile data, user visits, user interaction features used, duration of time, days of user visits, services used, user engagements, and/or acquisitions for a deployment region. The historical data can include some outcome metrics, such as a total amount spent or acquired. In some embodiments, the historical server 108 and/or the analysis server 104 can convert currency values to a common currency. The historical server 108 can store the historical data in the historical data storage 112. In some embodiments, the historical data can include time series data. For example, the historical data can include, but is not limited to, user visits, user interaction features used, services used, user engagements, and/or acquisitions with a date or time.

At block 404, sub-grouping of user profiles can be performed. The analysis server 104 can cluster user profiles for a deployment region in a sub-group. The analysis server 104 can cluster user profiles into sub-groups for deployment regions with and without the system change. In some embodiments, the analysis server 104 can, for each user profile associated with a deployment region, identify a geographic code associated with the user profile. In some embodiments, a geographic code can include a postal code. It can be advantageous to initially group user profiles based on geographic region because users in near geographic regions can be expected to share similar behaviors, shipping speed, distribution system, customs, and/or climate. The analysis server 104 can further cluster geographic codes with similar historical data. In some embodiments, the analysis server 104 can provide the historical data as input features to a machine learning model. The machine learning model can output a sub-group. In some embodiments, the machine learning model can include a decision tree. In some embodiments, the machine learning model can be trained to cluster geographic codes with similar historical data to form the sub-groups of user profiles. In some embodiments, the analysis server 104 can store the sub-groups in the model data storage 114.

The systems and methods described herein may improve the operation of a computer. Some existing methods can use clustering algorithms, such as a k-means clustering algorithm. However, using some of these clustering algorithms, such as k-means, can result in relatively slow performance when clustering large amounts of user profiles and/or geographic codes. Using a machine learning model, such as, but not limited to, a decision tree, can improve the clustering performance in some of the present embodiments described herein in contrast to using other clustering algorithms, such as k-means. Therefore, using a machine learning model in some of the present embodiments described herein for clustering can improve the operation of a computer.

At block 406, a synthetic control can be modeled. The analysis server 104 can model the synthetic control. Modeling the synthetic control can include the execution of the sub-blocks 408, 410, 412, 414 for processing features, estimating synthetic control, scaling outcome metrics, and calculating an effect metric. At block 408, features can be processed. The analysis server 104 can process features for sub-groups. The analysis server 104 can determine, from the historical data, features for each sub-group in a set of sub-groups.

Features can include, but are not limited to, a number of visits per week, a number of uses of a user interface feature per week, a duration of time in service, a number of active days per week, a utilization of service rate, an amount paid to a service, user engagements per week, and/or an amount of acquisitions. A duration of time in service can refer to a duration of time that a service associated with the system change has been available. For example, if the service associated with the system change is a streaming content service, then the duration of time in service can refer to how long the streaming content service has been available to users in the deployment region. Utilization of service rate can refer to user's usage of the service associated with the system change relative to other services offered by the user interface. For example, if the service associated with the system change is a streaming content service, then the utilization of service rate can refer to how much a user uses the streaming content service relative to other services offered by the user interface. The analysis server 104 can calculate features for sub-groups by combining historical data for user profiles using a statistical measure, such as an average. To calculate the statistical measure the analysis server 104 can divide an aggregated feature value for a sub-group by the number of users for that sub-group. Thus, the analysis server 104 can calculate an average number of visits per week, an average number of uses of a user interface feature per week, an average number of active days per week, etc. The analysis server 104 can store the features in the model data storage 114.

At block 410, synthetic control can be estimated. The analysis server 104 can determine, from the features, a combination of weights for a set of sub-groups to be a control sub-group for the sub-group associated with the system change. As described herein, in a first deployment region (such as an Italian region), a system change (such as a change to add a user interface feature) can be released during a time period; and a second deployment region (such as a Spanish region) may not have the system change released in the same time period. A first sub-group associated with the system change and the first deployment region (such as an Italian region) can be referred to as sub-group A (for example) and can be associated with features. The second set of sub-groups associated with the second deployment region (such as a Spanish region) and not associated with the system change can be referred to as sub-groups A', B', C', and D' (for example). Each sub-group from the second set of sub-groups can be associated with features for the respective sub-group. The analysis server 104 can determine, from the features, a combination of weights of sub-groups A' and B' (for example), such as 50% of each sub-group, that might mimic sub-group A from the first deployment region.

In some embodiments, the analysis server 104 can determine the combination of weights for the set of sub-groups in accordance with one or more formulas. A sub-group associated with a system change can be referred to as i. There can be N sub-groups not associated with the system change. $\hat{Y}_i(0)$ can represent the outcome metric for sub-group i without the system change. In particular, $\hat{Y}_i(0)$ can be calculated with the following equation: $\hat{Y}_1(0) = Y_i + \Sigma_{j \in control} W_{i,j} \cdot Y_j^{obs}$ where $W_{i,j}$ are the weights for the control sub-groups for the sub-group i and $Y_j^{obs}$ is the observed outcome metric from the sub-groups without the system change. The effect metric can be calculated by taking the difference between the observed outcome metric with the system change and the outcome metric for sub-group i without the system change, which can be represented with the following equation: $\tau_i = Y_i^{obs} - \hat{Y}_i(0)$. The analysis server 104 can penalize combination of weights for sub-groups with greater discrepancies between outcome metrics. The analysis server 104 can use the following equation to partly apply penalization:

$$\min_{W_i \in R^{n_0}} \left\| X_i' - \sum_{j=n_1+1}^{n} W_{i,j} X_j' \right\|^2 + \lambda \sum_{j=n_1+1}^{n} W_{i,j} \left\| X_i' - X_j' \right\|^2$$

such that $$W_{i,n_1+1} \geq 0, \ldots, W_{i,N} \geq 0 \text{ and } \sum_{j=n_1+1}^{n} W_{i,j} = 1.$$

For example, a first combination of weights of sub-groups A' and B' (for example), such as 50% of each sub-group, could have outcome metrics of $45 and $55, respectively, that mimic sub-group A with the system change. A second combination of weights of sub-groups C' and D' (for example), such as 50% of each sub-group, could have outcome metrics of $40 and $60, respectively, that mimic sub-group A with the system change. The analysis server 104 can apply a penalization function that rewards the first combination being selected over the second combination since there is a smaller discrepancy between outcome metrics for the first combination than the second combination.

In some embodiments, the analysis server 104 can determine the combination of weights for the set of sub-groups using a machine learning model. The analysis server 104 can provide the features for the sub-group associated with the system change as input to a machine learning model. Output of the machine learning model can indicate the combination of weights for the set of sub-groups that are not associated with the system change. In some embodiments, the machine learning model can include a decision tree. In some embodiments, the machine learning model can be trained with the features for the set of sub-groups that are not associated with the system change (sub-groups A', B', C', and D' (for example)). The output of the machine learning model can include the control outcome metric for the sub-group as if the system change had not been present (a counterfactual metric).

At block 412, the outcome metrics can be scaled. The analysis server 104 can scale multiple outcome metrics according to prior outcome metrics. The analysis server 104 can adjust the outcome metrics to be the same order of magnitude according to the prior outcome metrics. For example, a first deployment region (such as an American region) can have a sub-group with an outcome metric (such as an amount spent of $10) that is typically double than an outcome metric for a sub-group from a second deployment region (such as a Mexican region). The analysis server 104 can adjust the outcome metric for the second deployment region by doubling it, which can in effect normalize the outcome metrics. The analysis server 104 can divide an outcome metric by the root mean squared of past outcome metrics for each sub-group. The analysis server 104 can use the following equation to scale the outcome metrics, apply the weights to some of the scaled outcome metrics, and calculate the effect metric:

$$\hat{\tau}_i = \frac{Y_i}{\sqrt{\sum_{t=1}^{t=T_0} Y_{it}^2 / T_0}} - \sum_{j=n_1+1}^{n} W_{i,j} \cdot \frac{Y_j}{\sqrt{\sum_{t} Y_{jt}^2 / T_0}}$$

where t denotes the time period and for $T_0$, a time period, such as a number of months, prior to the system change can be considered.

At block 414, the effect metric can be calculated. The analysis server 104 can calculate a control outcome metric for the control sub-group using the second scaled outcome metrics and the combination of weights for the second set of sub-groups. The analysis server 104 can calculate the effect metric as a difference between the scaled outcome metric associated with the system change and the control outcome metric. As described herein, the analysis server 104 can calculate the effect metric by taking the difference between the observed outcome metric with the system change and the outcome metric for sub-group i without the system change, which can be represented with the following equation: $\tau_i = Y_i^{obs} - \hat{Y}_i(0)$. Moreover, the analysis server 104 can use the following equation to scale the outcome metrics, apply the weights to some of the scaled outcome metrics, and calculate the effect metric:

$$\hat{\tau}_i = \frac{Y_i}{\sqrt{\sum_{t=1}^{t=T_0} Y_{it}^2 / T_0}} - \sum_{j=n_1+1}^{n} W_{i,j} \cdot \frac{Y_j}{\sqrt{\sum_{t} Y_{jt}^2 / T_0}}.$$

In some embodiments, the effect metric can indicate a value change (such as a change in amount spent per user) or a percentage change (such as a change in the percentage spent per user). In some embodiments, the analysis server 104 can store the effect metric in the model data storage 114. In some embodiments, the effect metrics can be dynamically calculated in response to receiving a trigger, such as, but not limited to, user input received via a graphical user interface. In other embodiments, the effect metrics can be pre-calculated and stored for later use and/or presentation.

In some embodiments, the analysis server 104 can calculate the effect metric(s) and the data underlying the effect metric(s) at a granular level and store the granular data in the model data storage 114. As described herein, such as with respect to FIGS. 3A and 3B, a user can select user interface elements to update the graphical user interface. When the graphical user interface updates, the user interface server 120 can access the metrics and related data in the model data storage 114 and transform the data, such as, but not limited to, aggregating the data for presentation the graphical user interface. In some embodiments, the effect metric(s) can be associated with time series data. The analysis server 104 can aggregate an effect metric using the time series data, such as, but not limited to, an effect metric for each day, week, or month.

At block 416, the effect metric can be used. The user interface server 120 can present the effect metric in a graphical user interface. In some embodiments, the graphical user interface can present additional information, such as, but not limited to, a number of users, a credit value, and/or a statistical measure value (such as a mean value). The user interface server 120 can aggregate the data for presentation based on the input elements selected. Additional details regarding a graphical user interface are described herein, such as with respect to FIGS. 3A and 3B. In some embodiments, users of the graphical user interface can compare the estimated long-term impact (the effect metric) with short-term A/B test metrics. The effect metric can allow users to determine what types of system changes might lead to unexpected long-term impacts. Additionally or alternatively, the effect metric can also advantageously inform future system changes and allow users to make better future decisions.

In some embodiments, the user interface analysis system 110 can make automatic changes to the user interface system. The analysis server 104 can determine that the effect metric fails to satisfy a threshold value. For example, the analysis server 104 can determine that the effect metric (such as an impact percentage value) is below a threshold value. In response to determining that the effect metric fails to satisfy the threshold value, the analysis server 104 can automatically disable the system change (such as a user interface feature) in the deployment region. In some embodiments, disabling the system change can include, but is not limited to, either removing or reverting the system change in the deployment region. In some embodiments, a developer or analyst can review the automatic disabling of the system change and determine whether the disabling should be maintained or the system change should be re-activated.

While some of the embodiments described herein include a CDN 130 and PoPs 132A, 132B, the systems and methods described herein can be applied to other embodiments that do not use a CDN 130 or PoPs 132A, 132B. The methodology described herein for using synthetic control to estimate long-term impacts without conduct long-term testing can be used with any graphical user interface, including those graphical user interfaces without a CDN 130 or PoPs 132A, 132B.

Not necessarily all objects or advantages may be achieved in accordance with any particular embodiment described herein. Thus, certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Further, the term "each", as used herein, in addition to having its ordinary meaning, can mean any subset of a set of elements to which the term "each" is applied. The term "substantially" when used in conjunction with the term "real time" can refer to speeds in which no or little delay occurs.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
a data storage medium; and
one or more computer hardware processors in communication with the data storage medium, wherein the one or more computer hardware processors are configured to execute computer-executable instructions to at least:
   receive first historical data for a first deployment region in a Content Delivery Network (CDN) and a first time period, the first historical data comprising a first outcome metric,
      wherein a user interface feature was present in the first deployment region during the first time period;
   receive second historical data for a second deployment region in the CDN and a second time period, the second historical data comprising second outcome metrics,
      wherein the user interface feature was not present in the second deployment region during the second time period;
   cluster user profiles associated with the first deployment region into a first sub-group;
   cluster user profiles associated with the second deployment region into a second set of sub-groups;
   determine, from the first historical data, first features for the first sub-group;
   for each sub-group from the second set of sub-groups, determine, from the second historical data, features for the sub-group;
   determine, from the first features and the features for each of the second set of sub-groups, a combination of weights for the second set of sub-groups to be a control sub-group for the first sub-group;
   scale the first outcome metric and the second outcome metrics according to prior outcome metrics, wherein the scaling outputs a first scaled outcome metric and second scaled outcome metrics;
   calculate an effect metric for the user interface feature and the first sub-group, wherein to calculate the effect metric, the one or more computer hardware processors are configured to execute the computer-executable instructions to at least:
      calculate a control outcome metric for the control sub-group using the second scaled outcome metrics and the combination of weights for the second set of sub-groups; and
      calculate the effect metric as a difference between the first scaled outcome metric and the control outcome metric; and
   present, in a graphical user interface, the effect metric.

2. The system of claim 1, wherein to determine the combination of weights for the second set of sub-groups, the one or more computer hardware processors are configured to execute further computer-executable instructions to at least:
   provide the first features as input to a machine learning model, wherein output of the machine learning model indicates the combination of weights for the second set of sub-groups.

3. The system of claim 1, wherein to determine the combination of weights for the second set of sub-groups, the one or more computer hardware processors are configured to execute further computer-executable instructions to at least:
   penalize combination of weights for the second set of sub-groups with greater discrepancies between outcome metrics.

4. The system of claim 1, wherein to cluster user profiles associated with the first deployment region, the one or more computer hardware processors are configured to execute further computer-executable instructions to at least:
   provide the first historical data as input features to a machine learning model, wherein output of the machine learning model comprises the first sub-group.

5. The system of claim 1, wherein the one or more computer hardware processors are configured to execute further computer-executable instructions to at least:
   determine that the effect metric fails to satisfy a threshold value; and
   in response to determining that the effect metric fails to satisfy the threshold value,
      automatically disable the user interface feature in the first deployment region.

6. The system of claim 1, wherein the first features include at least one of: a number of visits per week, a number of uses of the user interface feature per week, a duration of time in service, a number of active days per week, a utilization of service rate, an amount paid to a service, user engagements per week, and/or an amount of acquisitions.

7. A computer-implemented method comprising:
receiving first historical data for a first deployment region and a first time period, the first historical data comprising a first outcome metric,
   wherein a system change was present in the first deployment region during the first time period;
receiving second historical data for a second deployment region and a second time period, the second historical data comprising second outcome metrics,
   wherein the system change was not present in the second deployment region during the second time period;
clustering user profiles associated with the first deployment region into a first sub-group;
clustering user profiles associated with the second deployment region into a second set of sub-groups;

determining, from the first historical data, first features for the first sub-group;

for each sub-group from the second set of sub-groups, determining, from the second historical data, features for the sub-group;

determining, from the first features and the features for each of the second set of sub-groups, a combination of weights for the second set of sub-groups to be a control sub-group for the first sub-group;

scaling the first outcome metric and the second outcome metrics according to prior outcome metrics, wherein the scaling outputs a first scaled outcome metric and second scaled outcome metrics; and calculating an effect metric for the system change and the first sub-group, wherein calculating the effect metric further comprises:

calculating a control outcome metric for the control sub-group using the second scaled outcome metrics and the combination of weights for the second set of sub-groups; and calculating the effect metric as a difference between the first scaled outcome metric and the control outcome metric.

8. The computer-implemented method of claim 7, wherein determining the combination of weights for the second set of sub-groups further comprises:

providing the first features as input to a machine learning model, wherein output of the machine learning model indicates the combination of weights for the second set of sub-groups.

9. The computer-implemented method of claim 8, wherein the machine learning model comprises a decision tree.

10. The computer-implemented method of claim 8, wherein the output of the machine learning model comprises the control outcome metric.

11. The computer-implemented method of claim 7, wherein determining the combination of weights for the second set of sub-groups further comprises:

penalizing combination of weights for the second set of sub-groups with greater discrepancies between outcome metrics.

12. The computer-implemented method of claim 7, wherein determining the first features for the first sub-group further comprises:

combining historical data for user profiles in the first sub-group using a statistical measure.

13. The computer-implemented method of claim 7, further comprising:

determining that the effect metric fails to satisfy a threshold value; and in response to determining that the effect metric fails to satisfy the threshold value, automatically disabling the system change in the first deployment region.

14. A system comprising:

a data storage medium; and one or more computer hardware processors in communication with the data storage medium, wherein the one or more computer hardware processors are configured to execute computer-executable instructions to at least:

receive first historical data for a first deployment region and a first time period, the first historical data comprising a first outcome metric, wherein a system change was present in the first deployment region during the first time period;

receive second historical data for a second deployment region and a second time period, the second historical data comprising second outcome metrics, wherein the system change was not present in the second deployment region during the second time period;

cluster user profiles associated with the first deployment region into a first sub-group;

cluster user profiles associated with the second deployment region into a second set of sub-groups;

determine, from the first historical data, first features for the first sub-group;

for each sub-group from the second set of sub-groups, determine, from the second historical data, features for the sub-group;

determine, from the first features and the features for each of the second set of sub-groups, a combination of weights for the second set of sub-groups to be a control sub-group for the first sub-group;

scale the first outcome metric and the second outcome metrics according to prior outcome metrics, wherein the scaling outputs a first scaled outcome metric and second scaled outcome metrics;

calculate an effect metric for the system change and the first sub-group, wherein to calculate the effect metric, the one or more computer hardware processors are configured to execute the computer-executable instructions to at least:

calculate a control outcome metric for the control sub-group using the second scaled outcome metrics and the combination of weights for the second set of sub-groups; and calculate the effect metric as a difference between the first scaled outcome metric and the control outcome metric.

15. The system of claim 14, wherein to cluster user profiles associated with the first deployment region, the one or more computer hardware processors are configured to execute further computer-executable instructions to at least:

for each user profile associated with the first deployment region, identify a geographic code associated with the user profile; and cluster geographic codes with similar historical data from the first historical data.

16. The system of claim 15, wherein the geographic code comprises a postal code.

17. The system of claim 14, wherein to cluster user profiles associated with the first deployment region, the one or more computer hardware processors are configured to execute further computer-executable instructions to at least:

provide the first historical data as input features to a machine learning model, wherein output of the machine learning model comprises the first sub-group.

18. The system of claim 17, wherein the machine learning model comprises a decision tree.

19. The system of claim 14, wherein to determine first features for the first sub-group, the one or more computer hardware processors are configured to execute further computer-executable instructions to at least:

combine historical data for user profiles in the first sub-group using a statistical measure.

20. The system of claim 14, wherein to scale first outcome metric and the second outcome metrics, the one or more computer hardware processors are configured to execute further computer-executable instructions to at least:

adjust the first outcome metric and the second outcome metrics to be a same order of magnitude according to the prior outcome metrics.

\* \* \* \* \*